US011348375B2

(12) United States Patent
Rowe

(10) Patent No.: US 11,348,375 B2
(45) Date of Patent: May 31, 2022

(54) SYSTEMS AND METHODS FOR USING FOCAL STACKS FOR IMAGE-BASED SPOOF DETECTION

(71) Applicant: ASSA ABLOY AB, Stockholm (SE)

(72) Inventor: Robert Kjell Rowe, Corrales, NM (US)

(73) Assignee: ASSA ABLOY AB, Stockholm (SE)

(*) Notice: Subject to any disclaimer, the term of this patent is extended or adjusted under 35 U.S.C. 154(b) by 163 days.

(21) Appl. No.: 16/601,839

(22) Filed: Oct. 15, 2019

(65) Prior Publication Data
US 2021/0110185 A1    Apr. 15, 2021

(51) Int. Cl.
G06F 21/32        (2013.01)
G06K 9/62         (2022.01)
G06V 40/40        (2022.01)
G03B 13/36        (2021.01)

(52) U.S. Cl.
CPC ............ *G06V 40/40* (2022.01); *G03B 13/36* (2013.01); *G06F 21/32* (2013.01); *G06K 9/6256* (2013.01); *G06V 40/45* (2022.01)

(58) Field of Classification Search
CPC .... G03B 13/36; G06F 21/32; G06K 9/00899; G06K 9/6256; G06V 40/40; G06V 40/45
See application file for complete search history.

(56) References Cited

U.S. PATENT DOCUMENTS 8,437,513 B1 * 5/2013 Derakhshani ...... G06K 9/00906
                                            382/115
9,607,138 B1   3/2017 Baldwin et al.
2006/0062438 A1  3/2006 Rowe
2006/0078323 A1 * 4/2006 Nakahara ............ G03B 13/36
                                            396/127
2008/0158612 A1 * 7/2008 Iwasaki ................ H04N 1/407
                                            358/3.26
(Continued)

FOREIGN PATENT DOCUMENTS

EP         2506189       10/2012
WO   WO-2019152983 A2 *  8/2019  ............... G06T 7/20
(Continued)

OTHER PUBLICATIONS

Raja et al. ("Robust face presentation attack detection on smartphones: An approach based on variable focus," IEEE International Joint Conference on Biometrics (IJCB), Oct. 1-4, 2017) (Year: 2017).*

(Continued)

Primary Examiner — Yubin Hung
(74) Attorney, Agent, or Firm — Schwegman Lundberg & Woessner, P.A.

(57) ABSTRACT

Disclosed herein are systems and methods for using focal stacks for image-based spoof detection. One embodiment takes the form of a method that includes obtaining a plurality of images of a biometric-authentication subject, the plurality of images captured by a camera system using a plurality of different focal distances; inputting, into an input-data-analysis module, a set of input data that includes the plurality of images; processing the set of input data using the input-data-analysis module to obtain, from the input-data-analysis module, a spoof-detection result for the biometric-authentication subject; and outputting the spoof-detection result for the biometric-authentication subject.

20 Claims, 5 Drawing Sheets

(56) References Cited

U.S. PATENT DOCUMENTS

| | | | |
|---|---|---|---|
| 2016/0163053 | A1 | 6/2016 | Tang et al. |
| 2017/0076145 | A1 | 3/2017 | Gottemukkula et al. |
| 2017/0180348 | A1 | 6/2017 | Piccolotto et al. |
| 2017/0323507 | A1* | 11/2017 | Masuda ............... G07D 7/20 |
| 2017/0344793 | A1* | 11/2017 | Xue ................. G06K 9/00906 |
| 2017/0345146 | A1* | 11/2017 | Fan .................. G06K 9/00228 |
| 2017/0351929 | A1* | 12/2017 | Kim .................. G06K 9/00604 |
| 2018/0025217 | A1 | 1/2018 | Chandraker et al. |
| 2018/0025244 | A1* | 1/2018 | Bohl ....................... G06T 7/97 382/116 |
| 2019/0026957 | A1 | 1/2019 | Gausebeck |
| 2019/0139206 | A1 | 5/2019 | Derakhshani |
| 2019/0205622 | A1 | 7/2019 | Hong |
| 2019/0213816 | A1 | 7/2019 | Grigorov et al. |
| 2019/0286885 | A1 | 9/2019 | Liu |
| 2019/0356905 | A1* | 11/2019 | Godard ............... H04N 13/271 |
| 2019/0373186 | A1 | 12/2019 | Egea et al. |
| 2020/0026941 | A1* | 1/2020 | Tan .................... G06K 9/00214 |
| 2020/0082160 | A1 | 3/2020 | Li et al. |
| 2020/0134342 | A1 | 4/2020 | Parupati et al. |
| 2020/0210738 | A1 | 7/2020 | Parupati et al. |
| 2020/0226777 | A1 | 7/2020 | Luo et al. |
| 2020/0334894 | A1 | 10/2020 | Long et al. |
| 2021/0064901 | A1* | 3/2021 | Vorobiev ........... G06K 9/00288 |
| 2021/0110018 | A1 | 4/2021 | Rowe et al. |

FOREIGN PATENT DOCUMENTS

| | | |
|---|---|---|
| WO | WO-2021074032 A1 | 4/2021 |
| WO | WO-2021074034 A1 | 4/2021 |

OTHER PUBLICATIONS

Husseis et al. ("A Survey in Presentation Attack and Presentation Attack Detection," International Carnahan Conference on Security Technology, Oct. 1-3, 2019) (Year: 2019).*

Kim et al. ("Face liveness detection using variable focusing," IEEE Biometrics Compendium, Jun. 4-7, 2013) (Year: 2013).*

Czajka et al. ("Presentation attack detection for iris recognition—an assessment of the state of the art," arXiv:1804.00194v3; Jun. 13, 2018) (Year: 2018).*

Kim et al. ("Face Liveness Detection Using Defocus," Sensors, No. 15; Jan. 2015) (Year: 2015).*

Yang, Libin ("Face liveness detection by focusing on frontal faces and image backgrounds," Proceedings of the 2014 International Conference on Wavelet Analysis and Pattern Recognition, Lanzhou, Jul. 13-16, 2014) (Year: 2014).*

U.S. Appl. No. 16/601,851, filed Oct. 15, 2019, Systems and Methods for Using Machine Learning for Image-Based Spoof Detection.

U.S. Appl. No. 16/922,456, filed Jul. 7, 2020, Systems and Methods for Enrollment in a Multispectral Stereo Facial Recognition System.

"International Application Serial No. PCT/EP2020/078413, International Search Report dated Jan. 27, 2021", 4 pgs.

"International Application Serial No. PCT/EP2020/078413, Written Opinion dated Jan. 27, 2021", 7 pgs.

"International Application Serial No. PCT/EP2020/078426, International Search Report dated Jan. 21, 2021", 4 pgs.

"International Application Serial No. PCT/EP2020/078426, Written Opinion dated Jan. 21, 2021", 6 pgs.

Das, Abhijit, "Recent Advances in Biometric Technology for Mobile Devices", IEEE 9th International Conference on Biometrics Theory, Applications and Systems (BTAS), (Oct. 22, 2018), 11 pgs.

Ebihara, Akinori F, "Specular- and Diffuse-reflection-based Face Liveness Detection for Mobile Devices", arXiv.1907.12400v1 [cs.CV], Cornell University Library, Ithaca, NY, (Jul. 29, 2019), 10 pgs.

Feng, Litong, "Integration of image quality and motion cues for face anti-spoofing: A neural network approach", Journal of Visual Communication and Image Representation, Academic Press, Inc, US, vol. 38, (Apr. 2016), 451-460.

Rehman, Yasar Abbas UR, "SLNet: Stereo face liveness detection via dynamic disparity-maps and convolutional neural network", Expert Systems With Applications, Oxford, GB, vol. 142, (Oct. 5, 2019), 12 pgs.

Sooyeon, Kim, "Face Liveness Detection Using Defocus", Sensors, vol. 15, No. 1, (Jan. 14, 2015), 1537-1563.

"U.S. Appl. No. 16/601,851, Non Final Office Action dated Jun. 10, 2021", 30 pgs.

"U.S. Appl. No. 16/922,456, Non Final Office Action dated Jun. 18, 2021", 18 pgs.

Wang, et al., "Exploiting temporal and depth information for multi-frame face anti-spoofing", arXiv: 1811.05118, (2019).

"International Application Serial No. PCT/EP2021/068617, International Search Report dated Oct. 12, 2021", 4 pgs.

"International Application Serial No. PCT/EP2021/068617, Written Opinion dated Oct. 12, 2021", 5 pgs.

Sohn, Kihyuk, "Unsupervised Domain Adaptation for Face Recognition in Unlabeled Videos", arXiv:1708.02191v1, Aug. 7, 2017.

Zhao, Yunhan, "Stretching Domain Adaptation: How far is too far?", arxiv.org, Cornell University Library, 201 Olin Library Cornell University Ithaca, NY 14853, (Dec. 6, 2017), 8 pgs.

Martino, J. Matias, "Liveness Detection Using Implicit 3D Features", arXiv: 1804.06702v2, (Apr. 19, 2018), 21 pgs.

Pang, Jiahao, "Cascade Residual Learning: A Two-Stage Convolutional Neural Network for Stereo Matching", IEEE International Conference on Computer Vision Workshops, Date of Conference: Oct. 22-29, 2017, (2017), 9 pgs.

Zhong, Yiran, "Open-World Stereo Video Matching with Deep RNN", arXiv: 1808.03959v1, (Aug. 12, 2018), 16 pgs.

* cited by examiner

SYSTEMS AND METHODS FOR USING FOCAL STACKS FOR IMAGE-BASED SPOOF DETECTION

CROSS REFERENCE TO RELATED APPLICATIONS

This application is being filed on even date with another U.S. patent application, which is entitled "Systems and Methods for Using Machine Learning for Image-Based Spoof Detection", and which is hereby incorporated herein by reference in its entirety.

TECHNICAL FIELD

Embodiments of the present disclosure relate generally to biometric recognition, authentication, and spoof detection, and more specifically to systems and methods for using focal stacks for image-based spoof detection.

BACKGROUND

As technology becomes increasingly pervasive in modern society, so too do illicit attempts to access systems such as personal computers, mobile devices, web servers, network servers, and the like. One such type of attempt involves what is known as spoofing. With respect to biometric authentication that involves facial authentication, spoofing attempts often involve the presentation of a two-dimensional (2D) or three-dimensional (3D) representation of an authorized user's face (or another face) to a camera system—that has a single camera or multiple cameras—of a given system (e.g., a mobile device) in the hopes that the system will incorrectly determine that the representation of the authorized user's face is the authorized user's actual face, and responsively grant access to the system (e.g., unlock the mobile device). In such a context, then, spoof detection, which is also known as presentation attack detection (PAD), typically includes what is often also referred to as liveness detection, which involves attempting to determine whether a subject being presented for authentication is a living, unaltered face as opposed to, as examples, a printed-out or screen-displayed picture of a face, a 3D model of a face, a 3D mask of a face, a face to which one or more prosthetic alterations have been made, or the like.

With respect to determining whether or not facial-authentication attempts are spoofing attempts, systems generally try to avoid or at least minimize the occurrence of both false negatives and false positives. In this context, a false negative is an incorrect determination that an actual spoofing attempt is not a spoofing attempt—e.g., an incorrect determination that a 2D or 3D representation of a face is a real, unaltered face. Conversely, a false positive is an incorrect determination that a non-spoofing authentication attempt is a spoofing attempt—e.g., an incorrect determination that a real, unaltered face (that incidentally may or may not belong to an authorized user) is in fact merely a 2D or 3D representation of a face. On the one hand, false negatives can result in granting system access to unauthorized parties. On the other hand, false positives can result in denying system access to authorized parties. There is accordingly a need for increased accuracy in image-based biometric spoof detection, including in the context of image-based facial authentication.

OVERVIEW

Disclosed herein are systems and methods for using focal stacks for image-based spoof detection. In at least one embodiment, a focal stack is a set of two or more images of a subject, where such images are captured using different focal distances. In at least some embodiments, the images in a given focal stack are captured within a relatively short amount of time, such as within a fraction of a second. For example, in at least one embodiment, consecutively captured images in a given focal stack are collected within 5-20 milliseconds (ms) of one another. The use of focal stacks for image-based spoof detection according to the present disclosure is unlike current implementations of facial-authentication systems, which are either single-focus implementations or are implementations in which specific facial characteristics in one or more images captured at a "best" (e.g. autofocus-selected) focal distance are deeply analyzed to determine whether or not to authenticate a face of a given biometric-authentication subject.

One embodiment takes the form of a method that includes obtaining a plurality of images of a biometric-authentication subject. The plurality of images are captured by a camera system using a plurality of different focal distances. The method also includes inputting, into an input-data-analysis module, a set of input data that includes the plurality of images. The method further includes processing the set of input data using the input-data-analysis module to obtain, from the input-data-analysis module, a spoof-detection result for the biometric-authentication subject. The method also includes outputting the spoof-detection result for the biometric-authentication subject.

Another embodiment takes the form of a system that includes an input-data-analysis module, a processor, and data storage that contains instructions executable by the processor for carrying out at least the functions listed in the preceding paragraph. Still another embodiment takes the form of a computer-readable medium containing instructions executable by a processor for carrying out at least those functions.

Furthermore, a number of variations and permutations of the above-listed embodiments are described herein, and it is noted that any variation or permutation that is described in this disclosure can be implemented with respect to any type of embodiment. For example, a variation or permutation that is primarily described in this disclosure in connection with a method embodiment can just as well be implemented in connection with a system embodiment and/or a computer-readable-medium embodiment. Furthermore, this flexibility and cross-applicability of embodiments is present in spite of any slightly different language (e.g., process, method, steps, functions, sets of functions, and/or the like) that is used to describe and/or characterize such embodiments.

BRIEF DESCRIPTION OF THE DRAWINGS

A more detailed understanding may be had from the following description, which is presented by way of example in conjunction with the following drawings, in which like reference numerals are used across the drawings in connection with like elements.

DETAILED DESCRIPTION

I. Introduction

Figure 1:
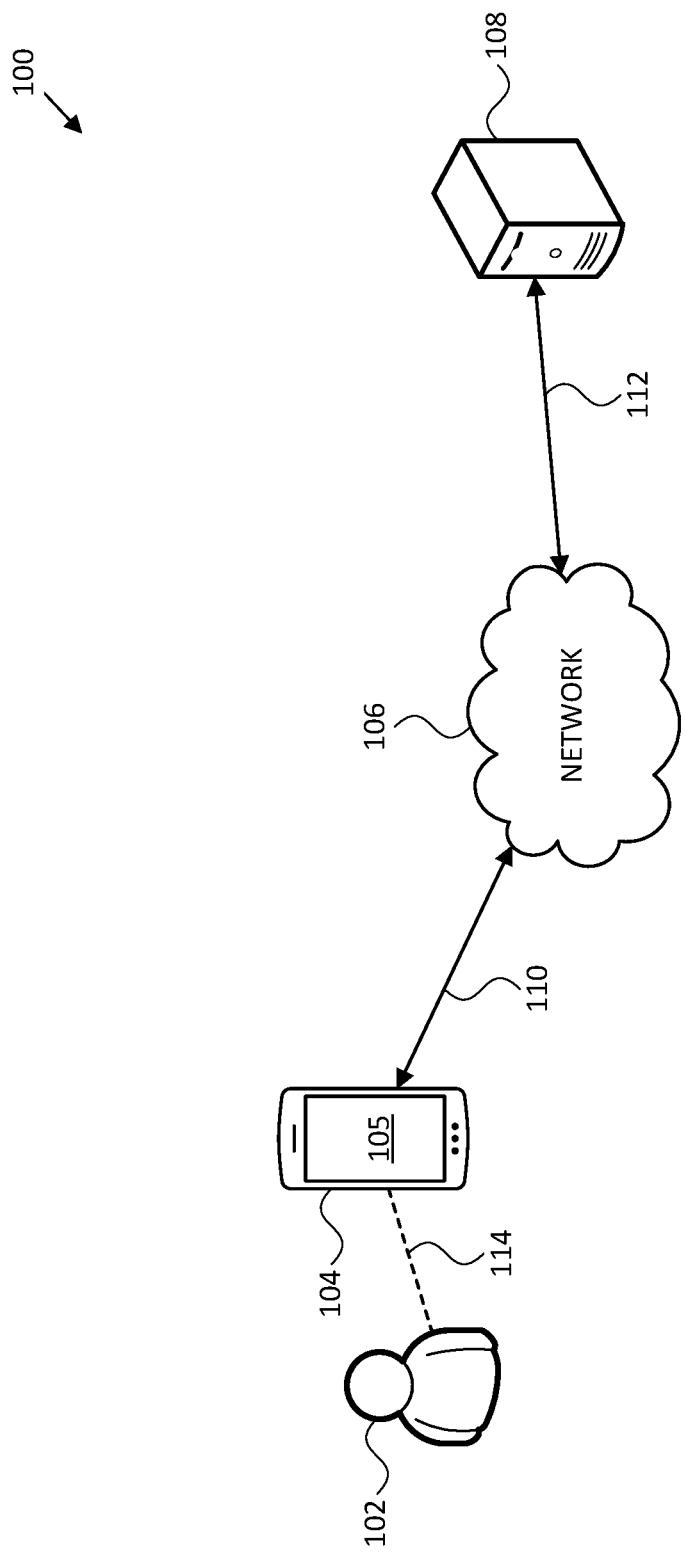
FIG. 1 is a diagram of an example communication context in which at least one embodiment can be carried out, the communication context including an example mobile device, in accordance with at least one embodiment.

To promote an understanding of the principles of the present disclosure, reference is made below to embodiments that are illustrated in the drawings. The embodiments disclosed herein are not intended to be exhaustive or to limit the present disclosure to the precise forms that are disclosed in the following detailed description. Rather, the described embodiments have been selected so that others skilled in the art may utilize their teachings. Accordingly, no limitation of the scope of the present disclosure is thereby intended.

In any instances in this disclosure, including in the claims, in which numeric modifiers such as first, second, and third are used in reference to components, data (e.g., values, identifiers, parameters, and/or the like), and/or any other elements, such use of such modifiers is not intended to denote or dictate any specific or required order of the so-referenced elements. Rather, any such use of such modifiers is intended to assist the reader in distinguishing any elements that are referenced in this manner from one another, and should not be interpreted as insisting upon any particular order or carrying any other significance, unless such an order or other significance is clearly and affirmatively explained herein.

Moreover, consistent with the fact that the entities and arrangements that are described herein, including the entities and arrangements that are depicted in and described in connection with the drawings, are presented as examples and not by way of limitation, any and all statements or other indications as to what a particular drawing "depicts," what a particular element or entity in a particular drawing or otherwise mentioned in this disclosure "is" or "has," and any and all similar statements that are not explicitly self-qualifying by way of a clause such as "In at least one embodiment," and that could therefore be read in isolation and out of context as absolute and thus as a limitation on all embodiments, can only properly be read as being constructively qualified by such a clause. It is for reasons akin to brevity and clarity of presentation that this implied qualifying clause is not repeated ad nauseum in this disclosure.

Furthermore, in this disclosure, one or more components of one or more devices, systems, and/or the like are referred to as modules that carry out (i.e., perform, execute, and the like) various functions. As used in the present disclosure, a module includes both hardware and instructions. The hardware can include one or more processors, one or more microprocessors, one or more microcontrollers, one or more microchips, one or more application-specific integrated circuits (ASICs), one or more field programmable gate arrays (FPGAs), one or more graphical processing units (GPUs), one or more tensor processing units (TPUs), and/or one or more devices and/or components of any other type deemed suitable by those of skill in the art for a given implementation. In some cases, a module includes at least one functional component (e.g., an application or part of an application, a block of code, and/or the like) executing in whole or in part on one or more processors of a host system or device.

The instructions for a given module are executable by the hardware for carrying out the one or more herein-described functions of the module, and can include hardware (e.g., hardwired) instructions, firmware, software, and/or the like, stored in any one or more non-transitory computer-readable media deemed suitable by those of skill in the art for a given implementation. Each such computer-readable medium can be or include memory (e.g., random access memory (RAM), read-only memory (ROM), erasable programmable read-only memory (EPROM), electrically erasable programmable read-only memory (EEPROM a.k.a. EPROM), flash memory, and/or one or more other types of memory) and/or one or more other types of non-transitory computer-readable medium. A module can be realized as a single component or be distributed across multiple components as deemed suitable by those of skill in the art.

II. Example Architecture

FIG. 1 is a diagram of a communication context 100 in which at least one embodiment of the present systems and methods can be carried out. As shown in FIG. 1, the communication context 100 includes a mobile device 104 that is associated (as indicated generally at 114) with a user 102. The mobile device 104 has a display 105, and is communicatively connected with a network 106 via a communication link 110. Furthermore, the communication context 100 also includes a server 108 that is communicatively connected with the network 106 via a communication link 112. The types and respective numbers of entities that are depicted in FIG. 1 are provided by way of example and not limitation. Other types and respective numbers of entities can be present in other instances.

The user 102 may be associated (114) with the mobile device 104 by ownership, lease, account subscription, and/or by any other type of association. In the herein-described examples, the user 102 is an authorized user of the mobile device 104. As an example, the mobile device 104 could be a mobile device provided to the user 102 by a wireless carrier with which the user 102 has a subscription for service. The user 102 may go through a configuration or set-up sequence with the mobile device 104, where that sequence includes the mobile device 104 storing one or more images of the face of the user 102. Once stored, the mobile device 104 may be arranged to unlock itself for use by the user 102 upon successful authentication of the user 102's face. The user 102 may present their face in front of the mobile device 104 to initiate such an operation. The mobile device 104 is described in additional detail below.

Furthermore, while it is in the case that, in some embodiments, successful authentication of the user 102 results in unlocking the mobile device 104 itself, it is also contemplated that successful authentication of the user 102 via the mobile device 104 could result in the granting of access to one or more other protected assets, such as a secured entryway, a secured computing device other than the mobile device 104, and/or the like. This could be instead of or in addition to successful authentication resulting in the granting of access to the mobile device 104 itself.

The network 106 can be or include any one or more types of networks (e.g., data networks). Some example types of networks that the network 106 can be or include are Internet Protocol (IP) networks such as the Internet, private data networks, public data networks, telephone networks, local area networks (LANs), wide area networks (WANs), wireless wide area networks (WWANs), personal area networks (PANs), and/or the like.

As used herein, a communication link (e.g., the communication link 110 and/or the communication link 112) can be or include one or more wired-communication (e.g., Ethernet) links and/or one or more wireless-communication (e.g., LTE, Wi-Fi, etc.) links. Furthermore a communication link can include one or more intermediate devices such as routers, bridges, gateways, network access servers (NASs), and/or the like. The server 108 can be any system of one or more servers arranged to provide any sort of one or more services. As examples, the server 108 can be or include a web server, an account-management server, an authentication server, and/or the like.

Moreover, it is noted that at least some embodiments of the present disclosure can be carried out entirely on and/or by a single system or device such as the mobile device 104, and that, with respect to such embodiments, the communication context 100 (including the network 106 and the server 108) is provided to show an example context in which the mobile device 104 may be arranged to operate as a general matter. Also, the description herein of embodiments being carried out on or by a mobile device (e.g., the mobile device 104) are also provided by way of example. Various embodiments of the present systems and methods can be carried out on or by any type of system (e.g., a computer that has an embedded or otherwise connected camera such as a webcam) that is suitably equipped, programmed, and configured to carry out the herein-described functions that are primarily described in this disclosure as being carried out on the mobile device 104.

Figure 2:
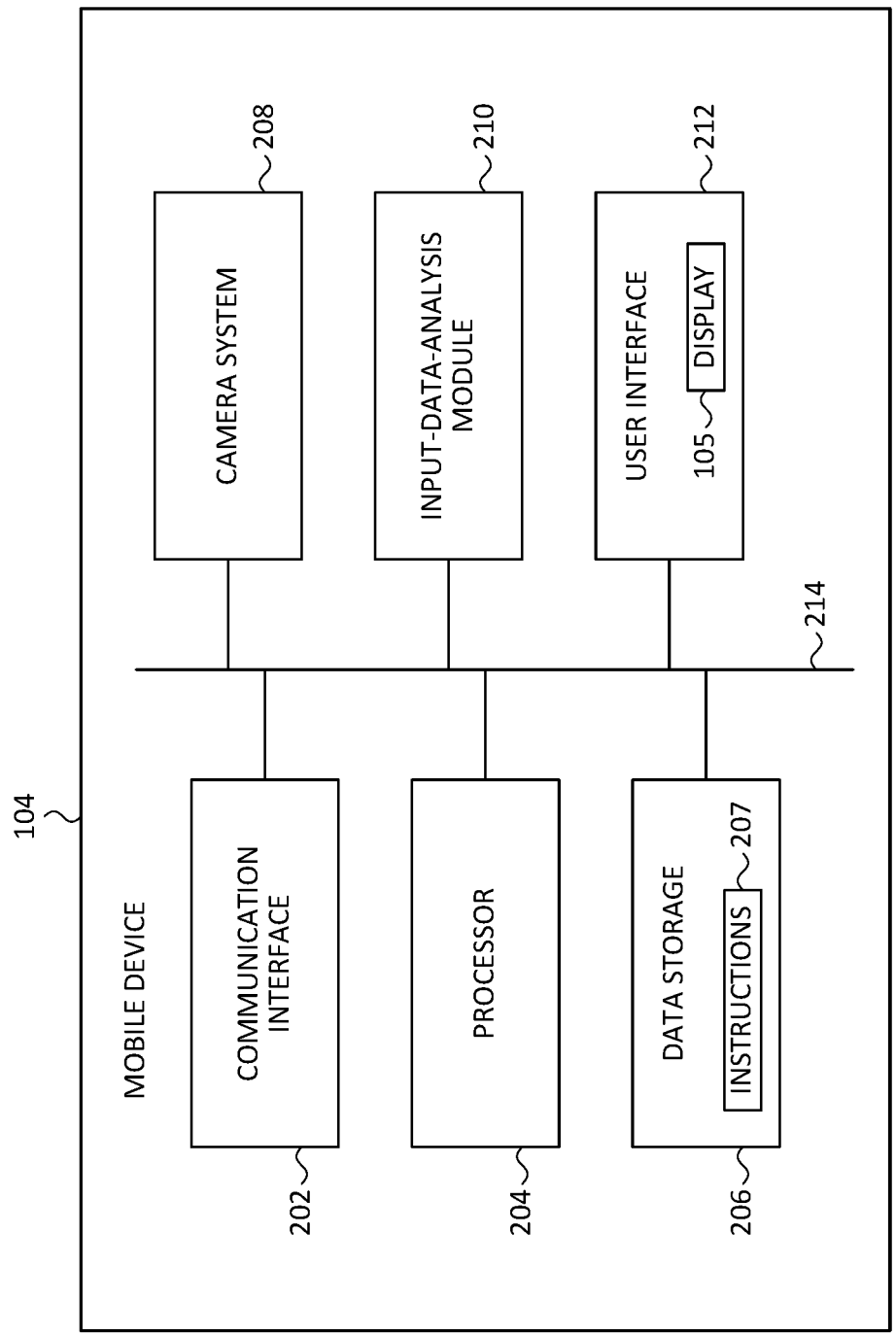
FIG. 2 is a diagram of an example architecture of the mobile device of FIG. 1, in accordance with at least one embodiment.

FIG. 2 is a simplified block diagram of an example architecture 200 of the mobile device 104. The architecture 200 is presented by way of example and not limitation. The mobile device 104 can have various different architectures in various different embodiments. Some elements that are depicted in FIG. 2 as being part of the architecture 200 can be omitted in some embodiments. Moreover, additional elements can be present. Furthermore, one or more of the depicted elements can be distributed across multiple functional components, while two or more of the depicted components can be combined into a lesser number of components. As depicted in the example architecture 200 of FIG. 2, the mobile device 104 includes a communication interface 202, a processor 204, a data storage 206, a camera system 208, an input-data-analysis module 210, and a user interface 212, all of which are communicatively connected via a system bus 214.

The communication interface 202 can include one or more wireless-communication interfaces (for communicating according to, e.g., LTE, Wi-Fi, Bluetooth, and/or the like) and/or one or more wired-communication interfaces (for communicating according to, e.g., Ethernet, USB, and/or the like). As such, the communication interface 202 may include any necessary hardware (e.g., chipsets, antennas, Ethernet cards, etc.), any necessary firmware, and any necessary software for conducting one or more forms of communication with one or more other entities.

The processor 204 may include one or more processors of any type deemed suitable by those of skill in the relevant art, some examples including a general-purpose microprocessor and a dedicated digital signal processor (DSP). The processor 204 can include one or more microprocessors, one or more microcontrollers, one or more microchips, one or more ASICs, one or more FPGAs, one or more GPUs, one or more TPUs, and/or one or more processing devices and/or processing components of any other type.

The data storage 206 may take the form of any non-transitory computer-readable medium or combination of such media, some examples including flash memory, ROM, and RAM to name but a few, as any one or more types of non-transitory data-storage technology deemed suitable by those of skill in the relevant art can be used. In at least one embodiment, the data storage 206 contains instructions 207 that are executable by the processor 204 for carrying out various mobile-device functions described herein. As described below, in at least some embodiments, the instructions 207 include an application executable by the processor 204 to carry out such functions.

The camera system 208 can include a single camera or multiple cameras. Each camera in the camera system 208 can be arranged to be capable of capturing images and/or video. In at least one embodiment, the camera system 208 includes at least one camera capable of capturing images. In some embodiments, the camera system 208 includes multiple cameras capable of capturing images. In at least one embodiment, the camera system 208 includes at least one front-facing camera, which is arranged to face the user 102 when the user 102 is looking at the display 105 of the user interface 212 of the mobile device 104. Any of the one or more cameras in the camera system 208 can be arranged to capture images in a visible-light spectrum, an infrared-light spectrum, a near-ultraviolet spectrum, and/or a wideband spectrum, as examples. A wideband spectrum can include both a near-ultraviolet spectrum and a visible-light spectrum, both a visible-light spectrum and an infrared-light spectrum, or all three of a near-ultraviolet spectrum, a visible-light spectrum, and an infrared-light spectrum, as examples.

The input-data-analysis module 210 can be realized as or on a distinct processing device or as a functional component executing on the processor 204, as examples. In some cases, the input-data-analysis module 210 is implemented on an ASIC, FPGA, or the like. The input-data-analysis module 210 can be programmed with hardwired instructions, firmware, and/or software to carry out the functions described herein as being carried out by the input-data-analysis module 210. In some embodiments, the input-data-analysis module 210 is configured to carry out machine learning. For example, in some embodiments, the input-data-analysis module 210 includes one or more neural networks.

The user interface 212 may include one or more input devices (a.k.a. components and the like) and one or more output devices (a.k.a. components and the like). With respect to input devices, the user interface 212 may include one or more touchscreens (e.g., the display 105), keyboards, mice, trackpads, touchpads, other pointing devices, buttons, switches, knobs, microphones, and/or the like. With respect to output devices, the user interface 212 may include one or more displays (e.g., the display 105), monitors, speakers, light-emitting diodes (LEDs), and/or the like. Moreover, one or more components of the user interface 212 could provide both user-input and user-output functionality. For example, the display 105 could be an interactive touchscreen-and-display component.

III. Example Operation

Figure 3:
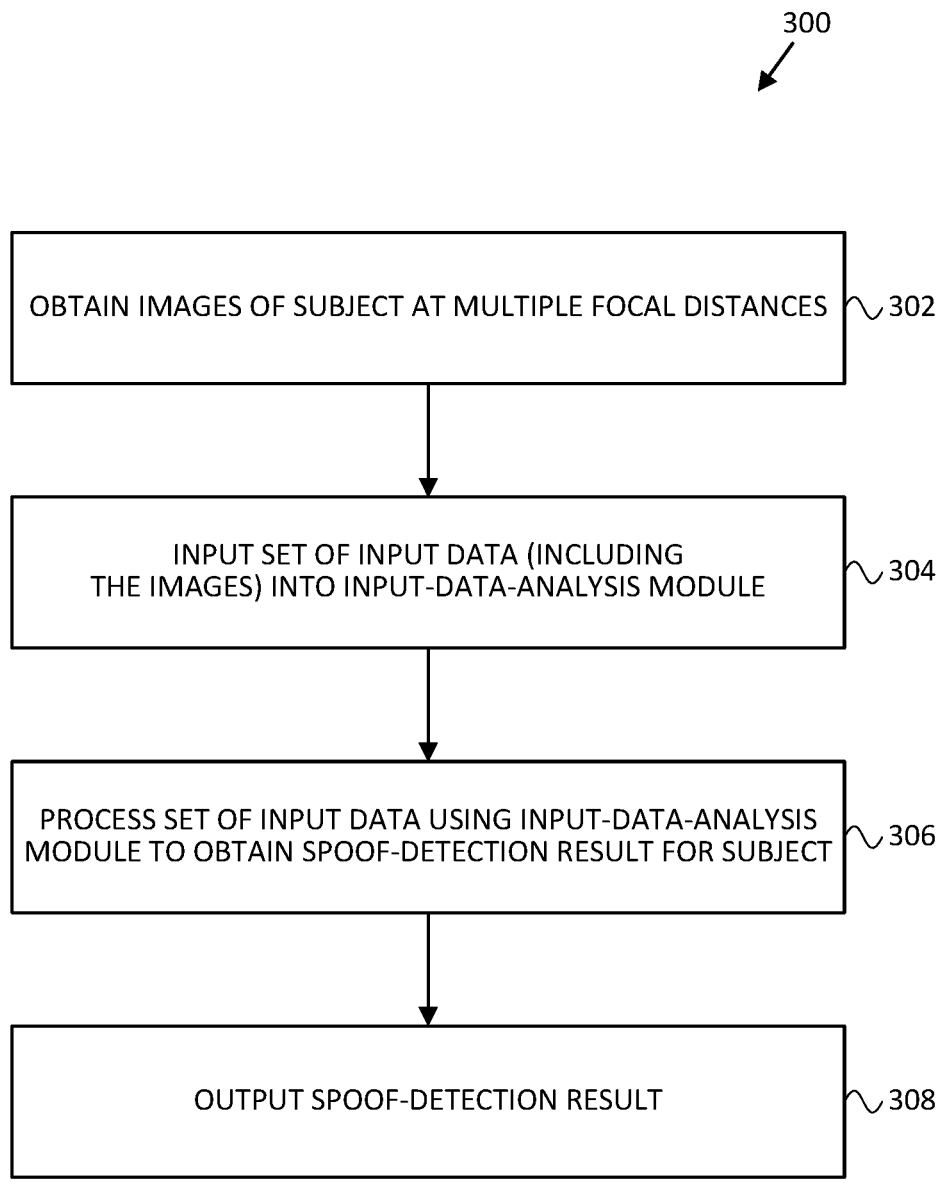
FIG. 3 is a flowchart of an example method, in accordance with at least one embodiment.

FIG. 3 is a flow diagram of a method 300, which is described herein by way of example as being carried out by the mobile device 104. In other embodiments, the method 300 can be carried out by any system or device that is suitably equipped, programmed, and configured to carry out the method 300. In this description, the method 300 is described as being carried by the mobile device 104 using the processor 204 to execute the instructions 207. Where applicable, the other example components of the example architecture 200 of the mobile device 104 are described as well in connection with one or more of the steps of the method 300. The description of the method 300 as being carried out by the mobile device 104 is for simplicity of presentation—as stated above, in at least one embodiment, the instructions 207 include an application that is executing on the mobile device 104 to carry out the method 300.

At step 302, the mobile device 104 obtains a plurality of images of a biometric-authentication subject at a plurality of different focal distances. In some cases, the biometric-authentication subject is related to a spoofing attempt and is a 2D or 3D representation of a face such as the face of the user 102, who is an authorized user of the mobile device 104. In other cases, the biometric-authentication subject is a real, unaltered, live human face that may or may not belong to the user 102. In the balance of this description, the term "spoof specimen" is used at times as shorthand for a 2D or 3D representation of the face of the user 102 that is being used in a given spoofing attempt. Furthermore, the term "real face" is used at times to refer to a real, unaltered, live human face that is associated with a given facial-authentication attempt.

In at least one embodiment, step 302 involves obtaining the plurality of images of the biometric-authentication subject from the camera system 208 of the mobile device 104. As stated, the instructions 207 can include an application that is executing on the processor 204 of the mobile device 104. That application may or may not have control via an application programming interface (API) or the like to affirmatively control the camera system 208. If the application does have such control, step 302 may involve operating the camera system 208 (e.g., sending one or more instructions to the camera system 208) to capture the plurality of images. Such instructions may include instructions to set different focal distances (using, e.g., a focal motor of the camera system 208) for different images in the plurality of images. In some embodiments, step 302 involves obtaining a respective one of the images at each of a plurality of predetermined focal-motor positions of a focal motor of the camera system 208. In some embodiments, step 302 involves obtaining a respective one of the images from each of the plurality of cameras each using different focal settings.

Whether or not the application has such control via an API or other mechanism, step 302 may involve receiving the plurality of images as or after they are captured by the camera system 208, which may capture the plurality of images using an active-focusing or autofocus function of the camera system 208. In other cases, the application may send a request to an operating system of the mobile device 104 that the plurality of images be captured at different specified focal distances. Other implementations are also possible.

As stated, the plurality of images of the biometric-authentication subject are captured at a plurality of different focal distances. Accordingly, the plurality of images may be referred to as a focal stack. Furthermore, in some embodiments, each of the images in the focal stack is captured at a different focal distance. In other embodiments, at least two images in the focal stack are captured at the same focal distance, though multiple focal distances are still represented within the focal stack as a whole. Furthermore, the order in which the various images in a given focal stack are captured can vary among different embodiments. In at least one embodiment, the images in a given focal stack are acquired in close succession, such as within fractions of a second of one another. In some embodiments, these fractions of a second are on the order of 5-20 ms, though this is by way of example and not limitation.

Figure 4:
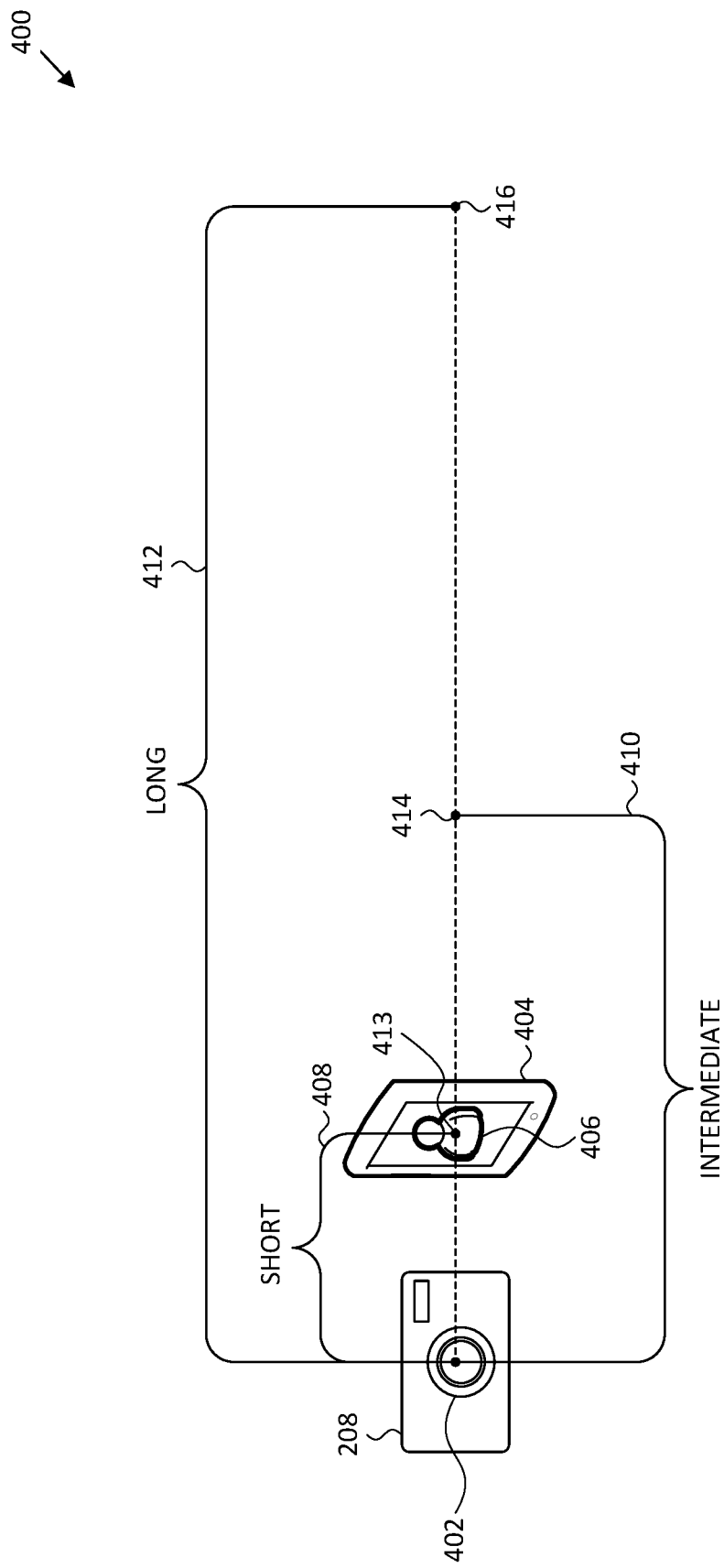
FIG. 4 is a diagram that depicts an example plurality of focal distances at which respective images can be acquired of a first biometric-authentication subject by the mobile device of FIG. 1 in connection with a first example spoofing attempt, in accordance with at least one embodiment.

With reference now to FIG. 4, the plurality of focal distances at which the respective images in the focal stack are captured can include a short focal distance 408, an intermediate focal distance 410 that is greater than the short focal distance 408, and a long focal distance 412 that is greater than the intermediate focal distance 410. In such an embodiment, one image in the focal stack can be captured at each of those focal distances 408, 410, 412. In other embodiments, more than one image can be captured at one or more of those focal distances 408, 410, 412. Instead of three focal distances, a focal stack can instead include images captured at two focal distances or at more than three focal distances. For simplicity, some embodiments are described below in which one image in the focal stack is captured at each of the three focal distances 408, 410, 412.

The short focal distance 408 can be substantially a shortest focal distance of which the camera system 208 is capable. In some embodiments, the short focal distance 408 is set in a range of approximately 3 inches to approximately 12-15 inches. As depicted in the diagram 400 of FIG. 4, the short focal distance 408 extends between a lens assembly 402 of the camera system 208 and a point 413.

In some embodiments, the short focal distance 408 is a focal distance that is characteristic of at least one type of spoofing attempt, such as a handheld-device-based spoofing attempt, which is the type of spoofing attempt that is depicted in FIG. 4. As depicted, a tablet 404—that is displaying an image 406 of the user 102—is positioned at the short focal distance 408 from the lens assembly 402. In this example, the tablet 404 is a relatively small tablet. Since the face that is shown in the image 406 that is displayed on the tablet 404 is smaller than the actual face of the user 102, the tablet 404 would typically be held closer to the camera system 208 during a spoofing attempt than the actual face of the user 102 would be during a genuine authentication attempt. As such, an image captured using the short focal distance 408 will be out of focus during genuine authentication attempts but will be in focus for many mobile-device-based (e.g., smartphone-based or tablet-based) spoofing attempts.

As depicted in the diagram 400, the intermediate focal distance 410 extends between the lens assembly 402 and a point 414, and the long focal distance 412 extends between the lens assembly 402 and a point 416. In some embodiments, the intermediate focal distance 410 is selected to be substantially at an expected distance (e.g., 12-15 inches) between the camera system 208 and the biometric-authentication subject for genuine authentication attempts. Moreover, in some embodiments, the long focal distance 412 is set to an effective-infinity value (e.g., 25 feet) for the camera system 208.

Furthermore, depending on the optical and/or other characteristics of the camera system 208, the short focal distance 408, the intermediate focal distance 410, and/or the long focal distance 412 can take on any values deemed suitable by those of skill in the art for a given implementation or in a given context. Thus, the short focal distance 408 could be shorter or longer than the above-listed example of approximately 3 inches, the intermediate focal distance 410 could be shorter or longer than the above-listed example of a value in the range of approximately 12-15 inches, and/or the long focal distance 412 could be a value that is shorter or longer than the above-listed example of 25 feet.

Figure 5:
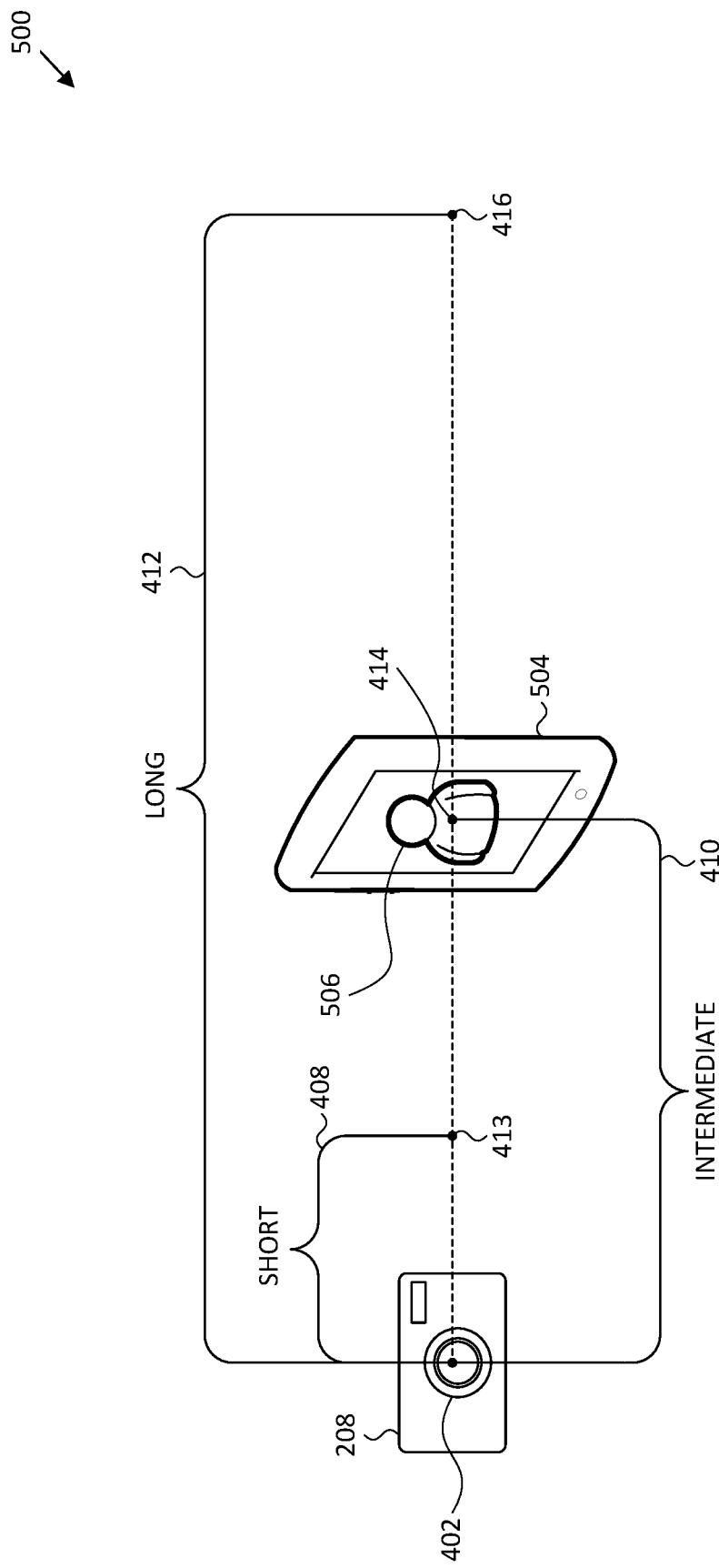
FIG. 5 is a diagram that depicts the plurality of focal distances of FIG. 4 at which respective images can be acquired of a second biometric-authentication subject by the mobile device of FIG. 1 in connection with a second example spoofing attempt, in accordance with at least one embodiment.

With reference now to FIG. 5, in some spoof attempts, a large-format image or video may be used. For example, as depicted in the example diagram 500 of FIG. 5, a large tablet 504 may display an image 506 of the user 102 at near-real size. And while the large tablet 504 is depicted in FIG. 5 as being used to display the image 506 of the user 102, in some cases a large-format image printed out on paper or the like could be used in some spoofing attempts. In such instances in which a relatively larger 2D representation of the face of the user 102 is used in a spoofing attempt, this type of spoof specimen may be held at a distance from the camera system 208 that corresponds to normal operating distances for facial-authentication attempts (e.g., the intermediate focal distance 410, which may be on the order of 12-15 inches).

In such a scenario, an image acquired at the short focal distance 408 may not show a strong disparity between this type of spoof attempt and non-spoof events. Further, the spoof specimen may include background features that extend beyond the image field of the facial-acquisition system (e.g., the camera system 208). In at least some such cases, no anomalous edges (e.g., transitions between spoof specimen and real background) or features of the display medium (e.g., edge of the tablet) may be apparent in the facial image acquired at the intermediate focal distance 410. However, with respect to the image captured using the long focal distance 412, the focal characteristics of the background of a large-format spoof may be different than those expected in the non-spoof case. A large-format spoof specimen may appear uniformly out of focus for both the subject and the background when imaged at effective infinity (e.g., at the long focal distance 412), while a real face would be expected to show a better focus for the distant background than the subject in such an image.

Returning now to FIG. 3, at step 304, the mobile device 104 inputs, into the input-data-analysis module 210, a set of input data that includes the focal stack obtained at step 302. In some embodiments, the set of input data is the focal stack. In other embodiments, the set of input data includes data in addition to the focal stack. As one example, in some embodiments, the set of input data includes data indicative of one or more of the image-acquisition capabilities of the camera system 208. This data can include information such as number of cameras, position of cameras, resolution of one or more cameras, focal length of one or more cameras, system type (e.g., phone or webcam), system make and model, and/or the like. As another example, in some embodiments, the set of input data includes data indicative of one or more of the image-capture-parameter settings used in connection with the capture of one or more of the images in the focal stack. Such settings can include exposure time, gain, ISO setting, focal settings, focal stepper motor positions, and/or other optical parameters, as examples.

In some embodiments, the set of input data includes data (e.g., tags) indicating that the plurality of different focal distances at which the images in the focal stack were captured represent fewer than all of a predetermined set of focal distances. For example, the predetermined set of focal distances may have three elements: the short focal distance 408, the intermediate focal distance 410, and the long focal distance 412. It may occur, however, that a given focal stack contains images captured at fewer focal distances (e.g., two) than what the application executing on the mobile device 104 considers to be a full set. This could be due to different devices having different focusing capabilities. These data tags can be used to identify instances in which fewer than what a given embodiment considers to be a full set of focal distances are included in a given focal stack.

At step 306, the mobile device 104 processes the set of input data using the input-data-analysis module 210 to obtain, from the input-data-analysis module 210, a spoof-detection result for the biometric-authentication subject. In some embodiments, the input-data-analysis module 210 applies logic to the images in the focal stack to obtain the spoof-detection result.

In one example embodiment, the input-data-analysis module 210 examines the image captured at the short focal distance 408 ("the short-focus image"). If the input-data-analysis module 210 determines that the short-focus image includes an in-focus face, the input-data-analysis module 210 may determine that the current facial-authentication attempt is a spoofing attempt. In some embodiments, the input-data-analysis module 210 may determine whether a given image or portion of a given image is in focus using techniques such as edge sharpness. The input-data-analysis module 210 may identify the presence or absence of a face in an image using known facial-recognition techniques or systems. Some examples of commercial facial-recognition systems are IFace (Innovatrics), TrulySecure (Sensory Inc.), and Face API (Microsoft). Some examples of open-source facial-recognition systems are OpenFace and OpenCV.

If, however, the input-data-analysis module 210 does not determine that the short-focus image includes an in-focus face, the input-data-analysis module 210 may then proceed to examine the image captured at the intermediate focal distance 410 ("the intermediate-focus image"). In particular, the input-data-analysis module 210 may determine whether or not the intermediate-focus image includes an in-focus face. If not, the input-data-analysis module 210 may determine that the current facial-authentication attempt is a spoofing attempt. If, however, the input-data-analysis module 210 determines that the intermediate-focus image does include an in-focus face, the input-data-analysis module 210 may then proceed to examine the image captured at the long focal distance 412 ("the long-focus image").

In particular, the input-data-analysis module 210 may determine whether the face and the adjacent background (immediately around the face/user) in the long-focus image are substantially equally out of focus or instead whether the adjacent background is more in focus than the face. If the input-data-analysis module 210 determines that the face and the adjacent background in the long-focus image are substantially equally out of focus, the input-data-analysis module 210 may determine that the current facial-authentication attempt is a spoofing attempt. If, however, the input-data-analysis module 210 determines that the adjacent background is more in focus than the face in the long-focus image, the input-data-analysis module 210 may determine that the current facial-authentication attempt is not a spoofing attempt. In some embodiments, however, there may be further logical tests that the input-data-analysis module 210 applies to one or more of the short-focus image, the intermediate-focus image, and the long-focus image prior to making a determination that the current facial-authentication attempt is not a spoofing attempt, as the logic described above is provided by way of a relatively simple example embodiment.

In some embodiments, the input-data-analysis module 210 includes a machine-learning module (e.g., a neural network such as a deep neural network). In such an embodiment, the neural network may, prior to assessing a given facial-authentication attempt, have been trained to output spoof-detection results based on the set of input data that is fed into the input-data-analysis module 210 at step 304. In some neural-network embodiments, the focal stack (as part or the entirety of the input-data set) is simply fed into the neural network during training and during inference (i.e., when assessing actual facial-authentication attempts) without being otherwise processed to identify characteristics of the images such as the presence of facial features and the like.

The neural network may be (e.g., iteratively) trained using techniques such as stochastic gradient descent, back propagation, and/or the like. Moreover, the training data may include focal stacks of both spoof specimens and real faces, as well as data labels regarding which focal stacks correspond with spoof specimens and which focal stacks correspond with real faces. Once properly trained, the neural network (or other analytic method) can make spoof-detection determinations based on focal stacks of biometric-authentication subjects. As described above, the input-data set fed into the neural network (both during training and inference) can include data in addition to focal stacks. Some examples of such additional data are described above in connection with step 304 of the method 300.

At step 308, the mobile device 104 outputs the spoof-detection result for the biometric-authentication subject. It is noted that the method 300 involves making a determination as to whether a given biometric-authentication subject is a spoof specimen or a real face, and the result of this determination is referred to herein as the spoof-detection result for the given biometric-authentication subject.

In some embodiments, the spoof-detection result is a Boolean value—i.e., either true (spoof) or false (real face). In some embodiments, the mobile device 104 denies access to at least one service (e.g., unlocking the mobile device 104) when the spoofing result is true. In some embodiments, the spoof-detection result is a score in a range of spoof-detection scores (e.g., 0-100, 0-1, or the like), and the mobile device 104 denies access to at least one service (e.g., unlocking the mobile device 104) based on a comparison of the spoof-detection score with a spoof-detection-score threshold. For example, the mobile device 104 may deny access to the at least one service when the spoof-detection score exceeds a threshold, or when the spoof-detection score is equal to or greater than a threshold, or the like.

The cases in which the spoof-detection result is a Boolean true and in which the spoof-detection result is a spoof-detection score that, e.g., exceeds an applicable threshold are collectively referred to below as being cases in which the spoof-detection result is positive—i.e., instances in which the mobile device 104 (e.g., an application represented by the instructions 207) has determined that a current facial-authentication attempt is a spoofing attempt. Other cases are referred to a being cases in which the spoof-detection result is negative.

It is further noted that, at step 308, the mobile device 104 "outputting" the spoof-detection result for the biometric-authentication subject does not necessarily mean outputting the spoof-detection result for the biometric-authentication subject via the user interface 212 of the mobile device 104. That can occur as part of step 308 in cases where the spoof-detection result is positive, as any further analysis to determine whether a presented biometric-authentication subject is actually the user 102 could be considered moot. In cases in which the spoof-detection result is negative, however, further processing may occur in which the same or another application evaluate whether the biometric-authentication subject that has been determined to at least be a real face is actually the real face of the user 102.

In such instances and in all instances, outputting the spoof-detection result can take the form of or include providing an indication of the spoof-detection result to another part of the same application, to another application, to an operating system of the mobile device 104, and/or the like. In general, step 308 can take the form of or include outputting the spoof-detection result by transmitting or otherwise providing the spoof-detection result to a receiving entity. In some embodiments, step 308 takes the form of or includes storing the spoof-detection result in memory or other data storage for use by one or more other entities.

As stated above, the method 300 is described herein by way of example and not limitation as being carried out by the mobile device 104. As a general matter, however, the present disclosure contemplates embodiments that are carried out entirely on the mobile device 104, embodiments that are carried out by a combination of the mobile device 104 and one or more other entities (e.g., the server 108), and embodiments that are carried out by one or more entities other than the mobile device 104. As but one example, in at least one embodiment, the mobile device 104 is used to collect a focal stack of a biometric-authentication subject, and the processing of that focal stack in order to obtain a spoof-detection result for the biometric-authentication subject is carried out at least in part on the server 108 and/or one or more other computing devices.

IV. Listing of Some Example Embodiments

One embodiment takes the form of a method that includes: obtaining a plurality of images of a biometric-authentication subject, the plurality of images captured by a camera system using a plurality of different focal distances; inputting, into an input-data-analysis module, a set of input data that comprises the plurality of images; processing the set of input data using the input-data-analysis module to obtain, from the input-data-analysis module, a spoof-detection result for the biometric-authentication subject; and outputting the spoof-detection result for the biometric-authentication subject.

In at least one embodiment, obtaining the plurality of images includes obtaining a respective one of the images at each of a plurality of predetermined focal-motor positions of a focal motor of the camera system.

In at least one embodiment, at least one of the focal distances is selected by an autofocus function of the camera system.

In at least one embodiment, the plurality of focal distances includes a short focal distance, an intermediate focal distance that is greater than the short focal distance, and a long focal distance that is greater than the intermediate focal distance. In at least one embodiment, the short focal distance is substantially at a shortest focal distance of which the camera system is capable. In at least one embodiment, the short focal distance is a focal distance that is characteristic of at least one type of spoofing attempt; in at least one such embodiment, the at least one type of spoofing attempt includes a handheld-device-based spoofing attempt. In at least one embodiment, the intermediate focal distance is substantially at an expected distance between the camera system and the subject for non-spoofing attempts. In at least one embodiment, the long focal distance is set to an effective-infinity value for the camera system.

In at least one embodiment, the method further includes sending, to the camera system, an instruction to capture the plurality of images of the subject at the plurality of focal distances.

In at least one embodiment, the camera system includes a mobile-device camera system of a mobile device.

In at least one embodiment, the input-data-analysis module includes a machine-learning module. In at least one embodiment, prior to processing the plurality of images using the machine-learning module, the machine-learning module had been trained using training data.

In at least one embodiment, the set of input data further includes data indicative of one or more image-acquisition capabilities of the camera system.

In at least one embodiment, the set of input data further includes data indicative of one or more image-capture-parameter settings associated with capture of one or more of the images in the plurality of images.

In at least one embodiment, the set of input data further includes data indicating that the plurality of different focal distances at which the images in the plurality of images were captured represent fewer than all of a predetermined set of focal distances.

In at least one embodiment, the spoof-detection result is a Boolean value selected from the group of Boolean values consisting of a spoof-detection-true indication and a spoof-detection-false indication, and the method further includes denying access to at least one service when the spoofing result is a spoof-detection-true indication.

In at least one embodiment, the spoof-detection result is a spoof-detection score in a range of spoof-detection scores, and the method further includes denying access to at least one service based on a comparison of the spoof-detection score with a spoof-detection-score threshold.

Another embodiment takes the form of a system that includes an input-data-analysis module; a processor; and data storage containing instructions executable by the processor for causing the system to carry out a set of functions, where the set of functions includes: obtaining a plurality of images of a biometric-authentication subject, the plurality of images captured by a camera system using a plurality of different focal distances; inputting, into the input-data-analysis module, a set of input data that includes the plurality of images; processing the set of input data using the input-data-analysis module to obtain, from the input-data-analysis module, a spoof-detection result for the biometric-authentication subject; and outputting the spoof-detection result for the biometric-authentication subject.

Another embodiment takes the form of a non-transitory computer-readable medium containing instructions that, when executed by a processor, cause a computer system to carry out a set of functions, where the set of functions includes: obtaining a plurality of images of a subject, the plurality of images captured by a camera assembly using a plurality of different focal distances; inputting, into an input-data-analysis module, a set of input data that includes the plurality of images; processing the set of input data using the input-data-analysis module to obtain a spoof-detection result for the subject from the input-data-analysis module; and outputting the spoof-detection result.

What is claimed is:

1. A method comprising:
obtaining a plurality of images of a biometric-authentication subject, the plurality of images captured by a camera system using a plurality of different focal distances;
inputting, into an input-data-analysis module, a set of input data that comprises the plurality of images;
processing the set of input data using the input-data-analysis module to obtain, from the input-data-analysis module, a spoof-detection result for the biometric-authentication subject, wherein processing the set of input data comprises determining whether a first one of the plurality of images corresponds to a spoofing attempt, and if it is not determined that the first one of the plurality of images corresponds to a spoofing attempt, then determining whether a second one of the plurality of images corresponds to a spoofing attempt; and
outputting the spoof-detection result for the biometric-authentication subject.

2. The method of claim 1, wherein obtaining the plurality of images comprises obtaining a respective one of the images at each of a plurality of predetermined focal-motor positions of a focal motor of the camera system.

3. The method of claim 1, wherein at least one of the focal distances is selected by an autofocus function of the camera system.

4. The method of claim 1, wherein the plurality of focal distances comprises a short focal distance, an intermediate focal distance that is greater than the short focal distance, and a long focal distance that is greater than the intermediate focal distance.

5. The method of claim 4, wherein the short focal distance is substantially at a shortest focal distance of which the camera system is capable.

6. The method of claim 4, wherein the short focal distance is between approximately 3 inches and approximately 12 inches.

7. The method of claim 4, further comprising if it is not determined that the second one of the plurality of images corresponds to a spoofing attempt, then determining whether a third one of the plurality of images corresponds to a spoofing attempt, wherein the first one of the plurality of images, the second one of the plurality of images, and the third one of the plurality of images are captured at corresponding different ones of the short focal distance, intermediate focal distance, and long focal distance.

8. The method of claim 4, wherein the intermediate focal distance is between approximately 12 inches and approximately 15 inches.

9. The method of claim 4, wherein the long focal distance is set to an effective-infinity value for the camera system.

10. The method of claim 1, further comprising sending, to the camera system, an instruction to capture the plurality of images of the subject at the plurality of focal distances.

11. The method of claim 1, wherein the camera system comprises a mobile-device camera system of a mobile device.

12. The method of claim 1, wherein the input-data-analysis module comprises a machine-learning module.

13. The method of claim 12, wherein, prior to processing the plurality of images using the machine-learning module, the machine-learning module had been trained using training data.

14. The method of claim 1, wherein the set of input data further comprises data indicative of one or more image-acquisition capabilities of the camera system.

15. The method of claim 1, wherein the set of input data further comprises data indicative of one or more image-capture-parameter settings associated with capture of one or more of the images in the plurality of images.

16. The method of claim 1, wherein the set of input data further comprises data indicating that the plurality of different focal distances at which the images in the plurality of images were captured represent fewer than all of a predetermined set of focal distances.

17. The method of claim 1, wherein the spoof-detection result is a Boolean value selected from the group of Boolean values consisting of a spoof-detection-true indication and a spoof-detection-false indication, the method further comprising denying access to at least one service when the spoofing result is a spoof-detection-true indication.

18. The method of claim 1, wherein the spoof-detection result is a spoof-detection score in a range of spoof-detection scores, the method further comprising denying access to at least one service based on a comparison of the spoof-detection score with a spoof-detection-score threshold.

19. A non-transitory computer-readable medium containing instructions that, when executed by a processor, cause a computer system to carry out a set of functions, wherein the set of functions comprises:

obtaining a plurality of images of a biometric-authentication subject, the plurality of images captured by a camera system using a plurality of different focal distances;

inputting, into an input-data-analysis module, a set of input data that comprises the plurality of images;

processing the set of input data using the input-data-analysis module to obtain, from the input-data-analysis module, a spoof-detection result for the biometric-authentication subject, wherein processing the set of input data comprises determining whether a first one of the plurality of images corresponds to a spoofing attempt, and if it is not determined that the first one of the plurality of images corresponds to a spoofing attempt, then determining whether a second one of the plurality of images corresponds to a spoofing attempt; and outputting the spoof-detection result for the biometric-authentication subject.

20. The non-transitory computer-readable medium of claim 19, wherein processing the set of input date further comprises if it is not determined that the second one of the plurality of images corresponds to a spoofing attempt, then determining whether a third one of the plurality of images corresponds to a spoofing attempt, wherein the first one of the plurality of images, the second one of the plurality of images, and the third one of the plurality of images are captured at corresponding different ones of a short focal distance, an intermediate focal distance that is greater than the short focal distance, and a long focal distance that is greater than the intermediate focal distance.

* * * * *